Oct. 5, 1937.   R. POOL   2,094,814
COOKING DEVICE
Filed March 24, 1936   2 Sheets-Sheet 1
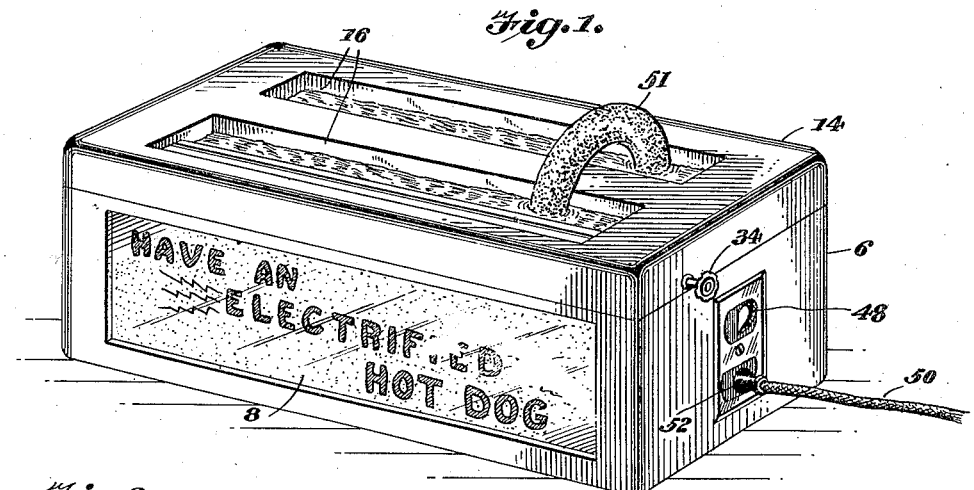
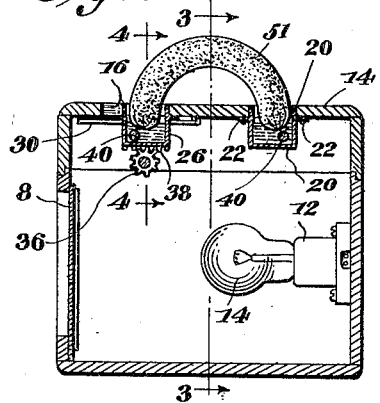
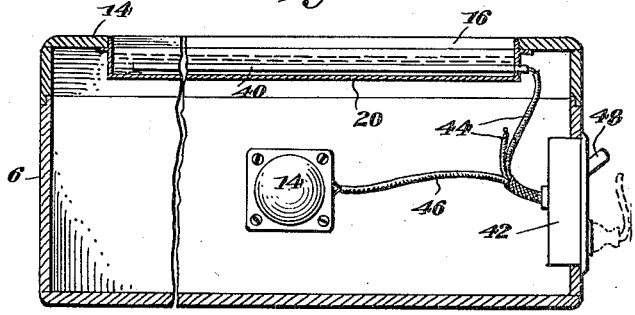
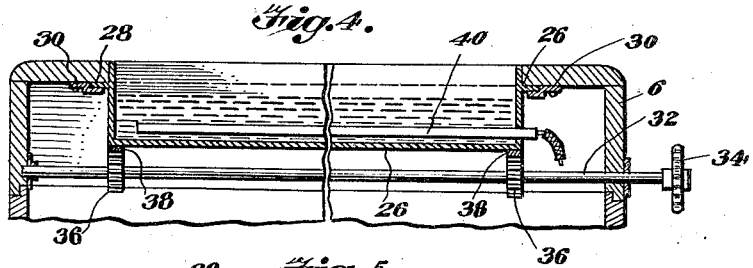
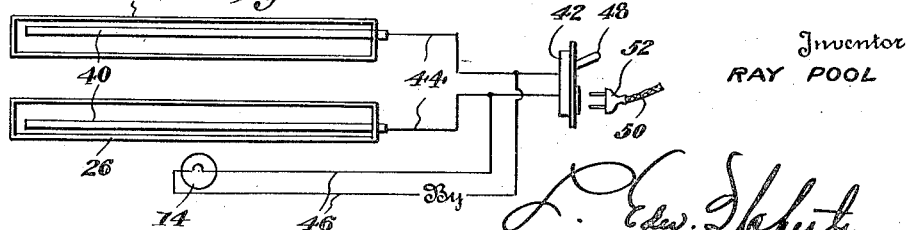
Inventor
RAY POOL Oct. 5, 1937.   R. POOL   2,094,814
COOKING DEVICE
Filed March 24, 1936   2 Sheets-Sheet 2
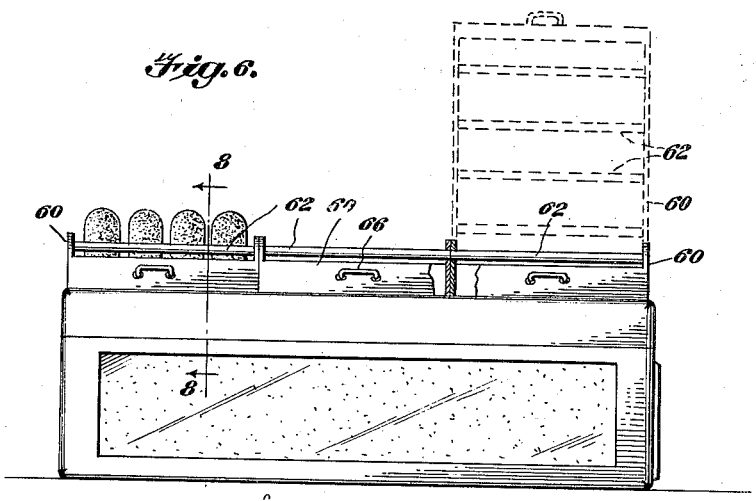
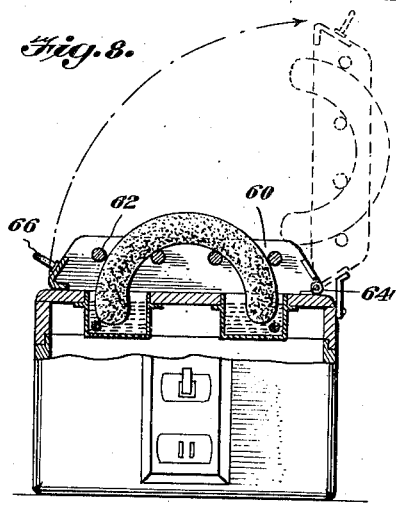
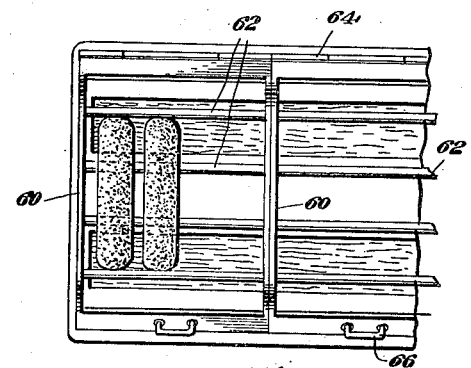
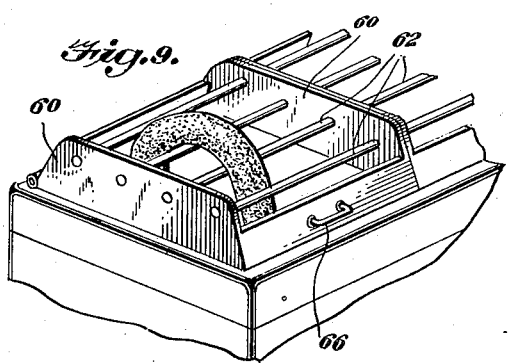
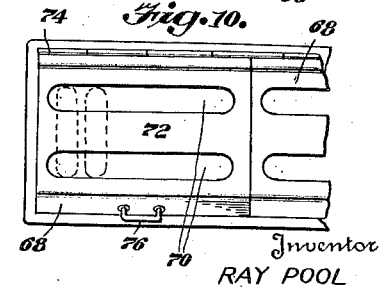
Inventor
RAY POOL Patented Oct. 5, 1937

2,094,814

UNITED STATES PATENT OFFICE 2,094,814

COOKING DEVICE

Ray Pool, Lawton, Okla.

Application March 24, 1936, Serial No. 70,696

8 Claims. (Cl. 219—19)

The present invention relates to a cooker, and more specifically to an electrical cooking device especially adapted for cooking raw foodstuffs such as weiners, beef, or the like.

One of the objects of the present invention is to provide an electrical cooking device of this character which will cook the raw product in such a manner as to prevent during the cooking operation the passing of any of the natural flavor or juices therefrom.

A still further important object of the invention is to provide a novel structure permitting of the easy insertion of the raw product therein, and the removal of the same therefrom.

A still further important object of the invention will be found to reside in the novel structure permitting of a perfect electrical contact with the raw product.

A still very important object of the invention is to provide a device of this character, which is especially adapted for cooking weiners, and which is constructed in such a manner to permit of the cooking of weiners of different sizes.

Broadly, the invention comprises a box-like structure having a pair of adjustable spacedly disposed troughs therein, in which there is arranged longitudinally extending electrodes. In these troughs a fluid of good electrical conducting quality such as salt water or the like is placed whereby upon the insertion of the ends of a weiner, or any other raw foodstuffs desired to be cooked, in place forming a perfect electrical connection between the foodstuff and the troughs or electrodes which are connected to a source of electrical supply.

In the accompanying drawings wherein like reference numerals designate corresponding parts throughout the same, Figure 1 is a perspective view of the cooking device showing the position of a weiner therein for passing electrical current therethrough and consequently cooking the weiner in the novel manner;

Figure 2 is a vertical sectional view of Figure 1;

Figure 3 is a longitudinal vertical sectional view of Figure 2 taken on line 3—3 thereof looking in the direction of the arrows;

Figure 4 is a fragmentary vertical sectional view of Figure 2 taken on line 4—4 thereof looking in the direction of the arrows;

Figure 5 is a wiring diagram showing the manner in which the electrodes are electrically connected to the source of electrical supply and also the method of connecting the illuminating means in circuit therewith for illuminating the sign of the cooking box.

Figure 6 is a front elevational view of the device showing a modified form thereof, in which there is provided a sectional pivotally mounted food rack;

Figure 7 is a top plan view thereof;

Figure 8 is an end view;

Figure 9 is a fragmentary perspective view showing one section of the rack in its lowered operative position; and Figure 10 is a further modified form of construction of a rack which may be pivotally mounted or otherwise secured to the device.

In the accompanying drawings wherein for the purpose of illustration there is shown a preferred embodiment of the invention, the reference numeral 6 generally designates a rectangular-shaped box in one side of which there is in any manner securely fastened adjacent a sight opening therein a transparent panel 8 on which there may be placed a sign of any character desired. On the side of the rectangular-shaped box-like structure 6 opposite the transparent panel 8 on which the sign is arranged is securely fastened an electric light bulb socket or receptacle 12 in which there is secured in the usual manner an illuminating or light bulb 14. It will thus be seen upon energization of the bulb 14 that the rays of light in combination with the transparent panel 8 effect an illumination of the sign thereon.

The box is provided with, as clearly illustrated in Figure 1, a cover 14 which is constructed of electrical insulating material, and in the top portion thereof is provided with spaced longitudinally extending rectangular-shaped openings 16. Referring now to Figures 2 and 3, it will be seen that there are secured to the underneath side of the cover directly beneath and registering with the apertures 16 a pair of troughs. The trough 20 is permanently secured to the underneath side of the cover 14 through the medium of screws or the like extending through apertures in the outwardly extending flanges 22. As illustrated in Figure 4, it will be seen that the other trough 26 has its flanges 28 slidably disposed in the support 30 secured to the underneath side of the box adjacent the edge of the other opening, to the end that the trough 26 is transversely slidable relative to the stationary trough 20 to permit of the adapting of the device to weiners or the like of different sizes. The adjustment and relative moving of the trough 26 is effected by means of the rod 32 which is longitudinally disposed in the cover 14 and mounted in the ends thereof for rotation through the medium of the handle 34 which is clearly shown in Figure 4. Securely fastened to the rotatable rod 32 are a pair of gears 36 which mesh with a rack 38 secured to the bottom of the trough 26. It will thus be seen that upon rotation in one direction or the other of the handle 34 the trough 26 is transversely movable with respect to the stationary trough 20. It is well to note in this connection that the width of the longitudinally extending opening below which the trough 26 is movable is such as to permit of a registering of the trough therewith over a substantially wide range of distances from the stationary trough 20.

In each trough there is secured a longitudinally extending electrode 40, one end of which projects through an opening in the end of each trough and to which there is securely fastened an electrical conductor to be more fully hereinafter described. These electrodes are constructed of carbon or any other satisfactory and good electrical conducting material and as clearly illustrated in Figures 3 and 5 are respectively connected to the switch box 42 through the medium of the electrical conductor 44. The electrical socket is connected in parallelism with the conductor 44 through the medium of the electrical conductors 46, there being provided an electrical switch 48 for controlling the flow of current to the electrical conductors from any source of electrical supply which is connected to the switch by means of an electrical conductor 50. If so desired the electrical conductor 50 as illustrated in Figure 1 may be provided with a male attaching member 52 which is inserted in the female receptacle of the switch box 42. The other end of the conductor 50 in any well known manner may be connected to the source of service supply such as 110 volts alternating current or the like.

A fluid of good electrical conducting character, such as salt water or the like is placed in each trough.

The weiner 51, or any other raw food material desired to be cooked, as clearly illustrated in the drawings, has its ends respectively immersed in the water or other fluid in each trough thereby upon energization of the electrodes through the medium of the switch 48 causes the current to flow through the weiner effecting a cooking of the same. It will thus be seen that the novelly constructed trough not only permits by virtue of the adjustability thereof of the use of different sized weiners, but also through the medium of the fluid a positive electrical contact between the weiner and the source of electrical supply. By virtue of this novel means of positively electrically connecting the weiner or other raw food material to the source of electrical supply, the necessity of employing clamps, or otherwise piercing the weiner or food material, is eliminated thereby during the cooking operation thereof causing the material to retain its natural flavor. Furthermore, it will be seen that the weiner may have its ends placed in the trough for positive electrical contact and subsequent cooking thereof without great care on the part of the operator, the fluid upon the insertion of the ends completely surrounding the same and forming a positive electrical contact.

Referring now to Figures 6 to 9, inclusive, wherein there is shown a modified form of the invention illustrating one type of food rack which may be employed for holding the food in position for cooking the same, or when so desired, of novelly removing the food from the trough. The reference numeral 60 generally designates one section of the pivotally mounted rack which is secured to the top of the box, it being obvious that any desired number of such sections may be employed. The rack 60 comprises a substantially rectangular-shaped frame having a plurality of longitudinally extending spaced rods 62 secured between the ends thereof. One side of the rack 60 is pivotally mounted to the upper portion of the top of the box as at 64 and the front is provided with a handle 66. As clearly illustrated the raw material, such as for example weiners, is trained over the two centrally disposed spaced rods the free ends thereof extending downwardly as clearly illustrated in Figure 8, whereupon a lowering of the rack immerses the ends of the weiners in the respective troughs for electrical contacting thereof. After the weiner is sufficiently heated or cooked, upon a raising of the rack to the position illustrated in Figure 8, the weiner may be removed therefrom without the necessity of turning off the electrical current. By providing a plurality of such racks any number of such weiners may be cooked at a time and during the rush hours if so desired all of the racks may be brought into use.

Referring now to Figure 10, it will be seen that there is shown a further modified form of rack 68 which is provided with spaced longitudinally extending slots 70 in the upper portion thereof, the weiners being placed over the centrally disposed dividing member 72 the free ends thereof extending downwardly in the slots 70 for immersion in the trough. The rack 68 is pivotally mounted as at 74 to the top portion of the box and is raised and lowered in the same manner by means of the handle 76 as previously described with respect to the other form of rack. Obviously, it is within the scope of the invention to provide any desired type of rack which will enable upon a raising or lowering of the same the immersion of the ends of the weiners or other raw material in the respective troughs and the removal of the same therefrom.

Obviously, if so desired, the lid of the box may be constructed of material of electrical conductivity, the trough insulated therefrom, or if so desired, the trough may be constructed of insulating material depending upon the desire of the manufacturer.

Obviously, the invention is not limited to this particular structure which is especially adapted for cooking weiners inasmuch as within the spirit of the invention, the novel trough structure for effecting through the medium of the fluid a positive electrical contact with the raw material may be arranged in any suitable support for effecting this contact of different types and kinds of raw material.

While there is shown for the purpose of illustration a preferred embodiment of the invention, it is to be specifically understood that as hereinbefore set forth it is capable of various changes and modifications without departing from the spirit and scope, and it is intended therefore that only such limitations shall be imposed thereon as are indicated in the prior art in the appended claims.

What is claimed is:

1. A cooking device of the class described comprising a pair of spaced troughs, a fluid of electrical conducting material in each of said troughs, a rack on one of said troughs, a gear cooperating with said rack, means for actuating said gear to adjust said trough relative to said other trough, an electrode in each trough, and means for connecting a source of electrical supply to said electrodes.

2. A cooking device of the class described comprising a box-like support having a pair of spaced longitudinally extending openings in the upper portions thereof, a trough disposed beneath each of said openings and registering therewith, one of said troughs being movable for lateral adjustment of said trough with respect to said other trough, an electrode in each of said troughs, a fluid of electrical conducting material in each trough, and means for connecting said electrodes to a source of electrical supply.

3. A cooking device of the class described comprising a box-like structure, a pair of spaced troughs therein, gear and rack means for adjusting one of said troughs relative to said other trough, an electrode in each of said troughs, and means for connecting a source of electrical supply to said electrodes.

4. A cooking device of the class described comprising a box-like support having a pair of spaced longitudinally extending openings in the upper portions thereof, a trough disposed beneath each of said openings and registering therewith, a rack on one of said troughs, a gear meshing with said rack, means for actuating said gear for adjusting said trough laterally with respect to said other trough, an electrode in each of said troughs, a fluid of electrical conducting material in each trough, and means for connecting said electrodes to a source of electrical supply.

5. A cooking device of the class described comprising a box-like support having a pair of spaced longitudinally extending openings in the upper portions thereof, a trough fixedly secured beneath one of said openings and in registering engagement therewith, a trough slidable beneath said other opening and in registering engagement therewith, means for sliding said slidable trough for adjusting said trough with respect to said other trough, an electrode in each of said troughs, a fluid of electrical conducting material in each trough, and means for connecting said electrodes to a source of electrical supply.

6. A cooking device of the class described comprising a box-like support having a pair of spaced longitudinally extending openings in the upper portions thereof, a trough fixedly secured beneath one of said openings and registering therewith, a second trough slidable laterally beneath said other opening and registering therewith, a rack mounted on said slidable trough, a rotatably mounted shaft, a gear on said shaft in mesh with said rack, means on said shaft for rotating said shaft to laterally adjust said slidable trough with respect to said other trough, an electrode in each of said troughs, a fluid of electrical conducting material in each trough, and means for connecting said electrodes to a source of electrical supply.

7. A cooking device of the class described comprising a box-like support having a pair of spaced longitudinally extending openings in the upper portions thereof, a trough disposed beneath each of said openings and registering therewith, an electrode in each of said troughs, a fluid of electrical conducting material in each trough, means for connecting said electrodes to a source of electrical supply, a food carrying frame pivotally mounted to the upper portion of said box-like support for swinging movement on top of said support and upwardly therefrom, said frame having a plurality of longitudinally disposed spaced rods therein between which the food is held, the ends of the food in the lowermost position of the frame being adapted to be received in said troughs for passing an electrical current therethrough.

8. A cooking device of the class described comprising a box-like support having a pair of spaced longitudinally extending troughs therein, an electrode in each of said troughs, a fluid of electrical conducting material in each trough, means for connecting said electrodes to a source of electrical supply, a food carrying frame pivotally mounted to the upper portion of said support for swinging movement on top of said support and upwardly therefrom, said frame having a plurality of longitudinally disposed spaced rods therein between which the food is held, the ends of the food in the lowermost position of said frame being adapted to be received in said troughs for passing an electrical current therethrough.

RAY POOL.